United States Patent [19]

Murano

[11] Patent Number: 5,001,571
[45] Date of Patent: Mar. 19, 1991

[54] METHOD AND SYSTEM FOR SELECTING FRAME SIZE OF IMAGE DATA IN DATA TRANSMISSION

[75] Inventor: Katsumi Murano, Tachikawa, Japan

[73] Assignee: Kabushiki Kaisha Toshiba, Kawasaki, Japan

[21] Appl. No.: 546,708

[22] Filed: Jul. 2, 1990

Related U.S. Application Data

[63] Continuation of Ser. No. 328,660, Mar. 27, 1989, abandoned.

[30] Foreign Application Priority Data

Mar. 31, 1988 [JP] Japan .................................. 63-76102
Aug. 11, 1988 [JP] Japan ................................. 63-200543
Dec. 1, 1988 [JP] Japan ................................. 63-304648
Jan. 25, 1989 [JP] Japan ..................................... 1-13992

[51] Int. Cl.$^5$ ............................................. H04M 1/00
[52] U.S. Cl. .................................. 358/434; 358/456; 358/458
[58] Field of Search ................ 358/434, 453, 436, 433

[56] References Cited

FOREIGN PATENT DOCUMENTS 0193410 9/1986 European Pat. Off. .
1436394 5/1976 United Kingdom .
2117604A 10/1983 United Kingdom .

*Primary Examiner*—Edward L. Coles, Sr.
*Attorney, Agent, or Firm*—Finnegan, Henderson, Farabow, Garrett and Dunner

[57] ABSTRACT

In a facsimile system, a document to be transmitted is read by a reader. The read image data is stored into an image memory. A control and processing section automatically selects a frame size of the image data in accordance with conditions of a transmission line to be used including a transmission distance between a calling system and a called system. The image data is framed by the selected frame size. The framed image data is then transferred through a MODEM to the transmission line. The facsimile system can effectively transmit the framed image data to the called system.

16 Claims, 7 Drawing Sheets

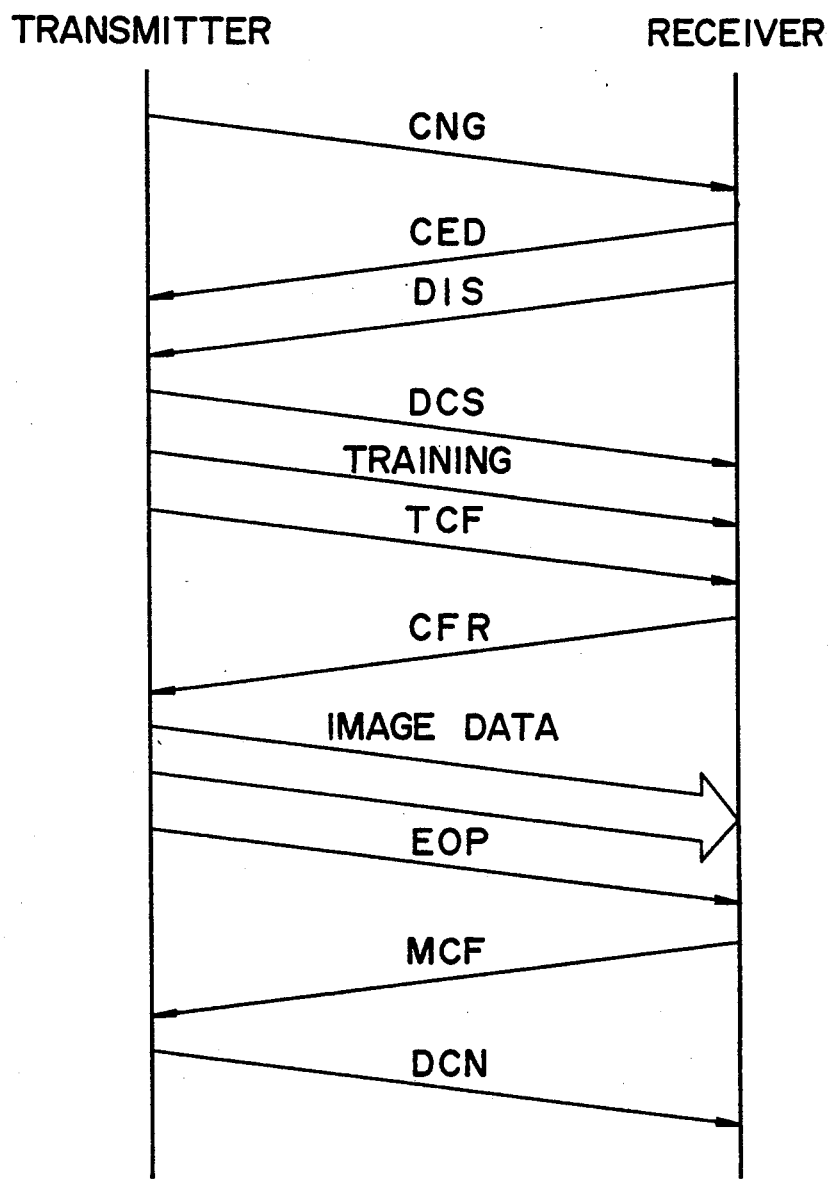
F I G. 1

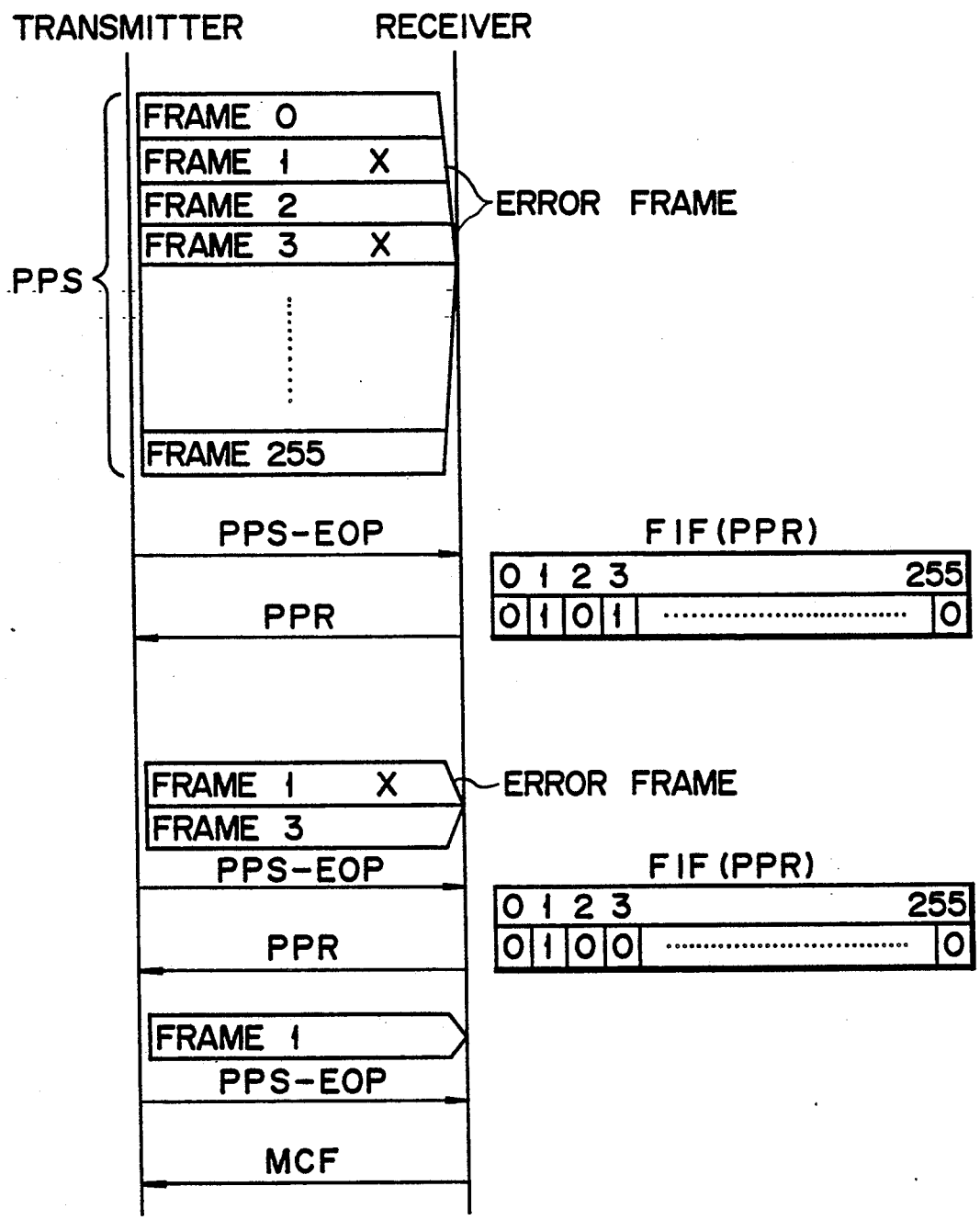
F I G. 4

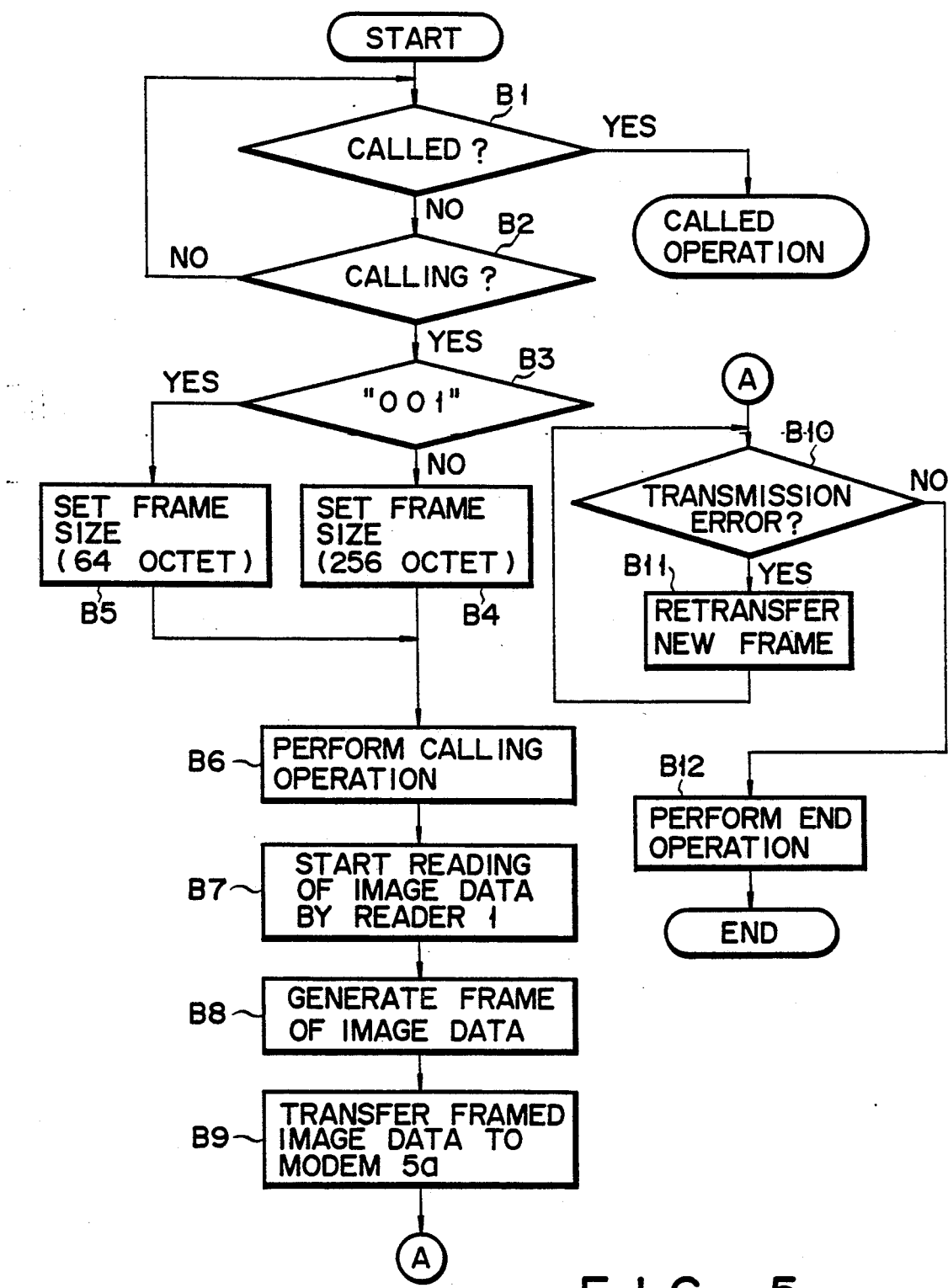
F I G. 5

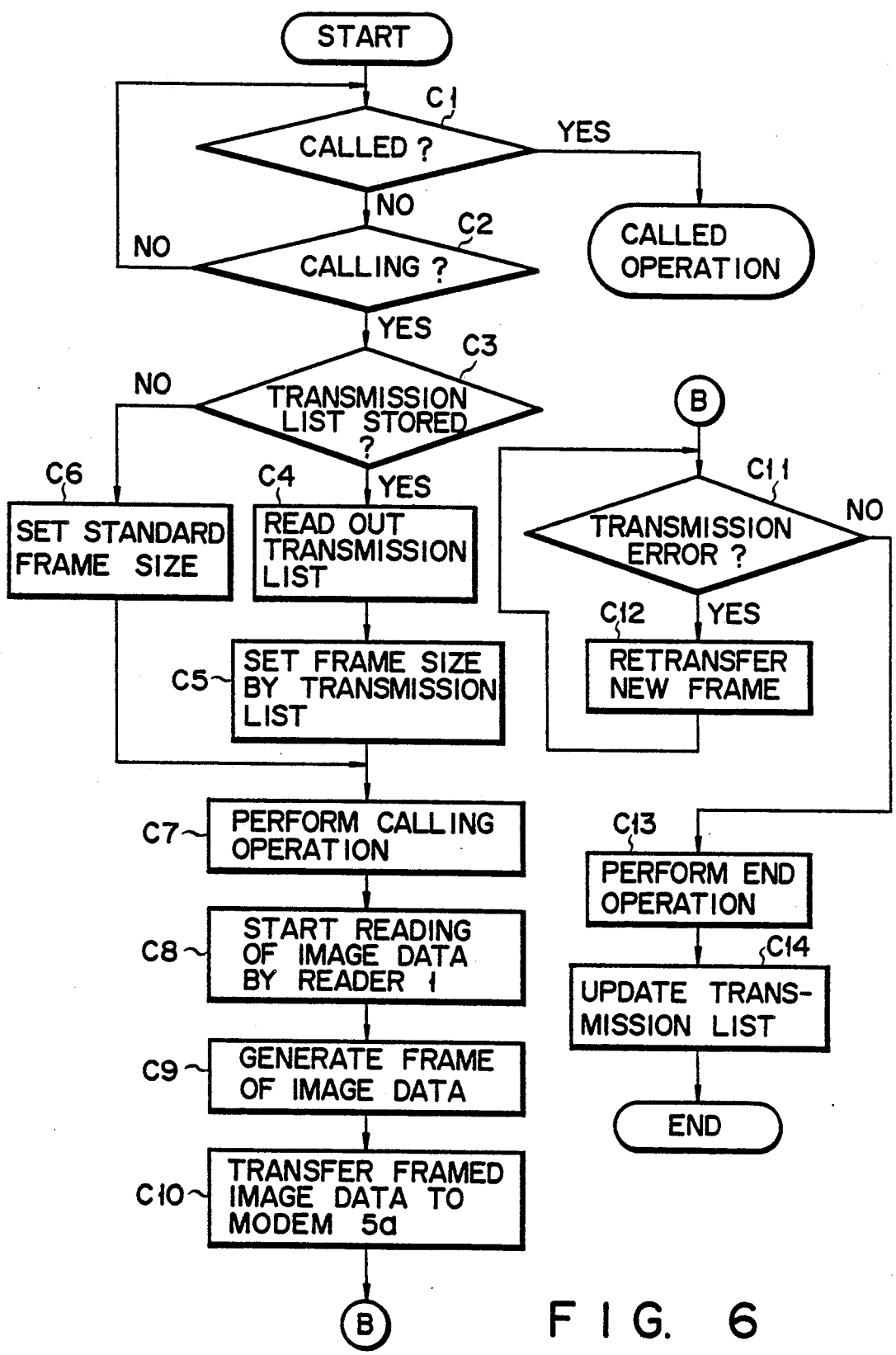
F I G. 6

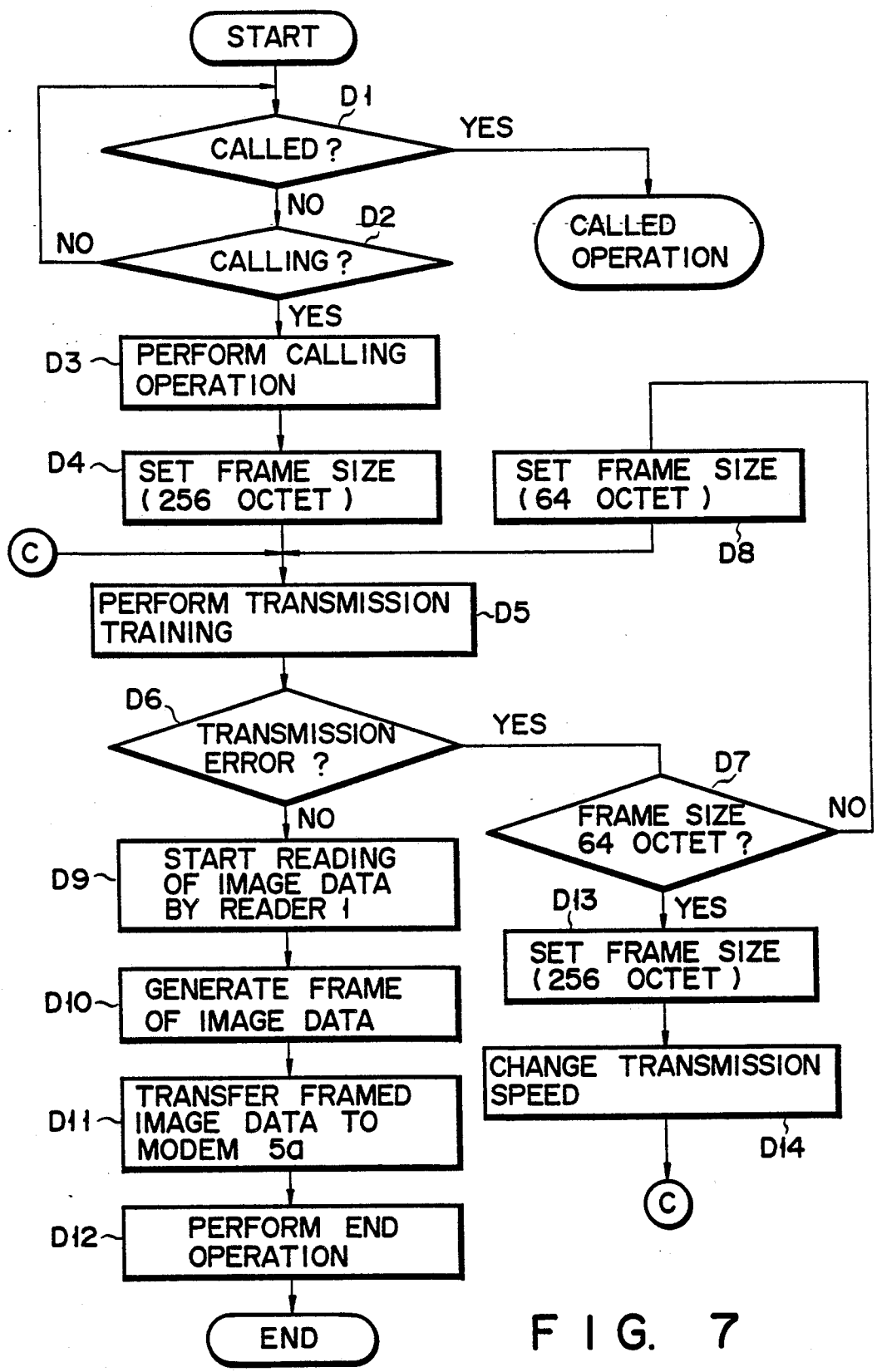
F I G. 7

METHOD AND SYSTEM FOR SELECTING FRAME SIZE OF IMAGE DATA IN DATA TRANSMISSION

This application is a continuation of application Ser. No. 07/328,660 filed Mar. 27, 1989, now abandoned.

BACKGROUND OF THE INVENTION

1. Field of the Invention

The present invention relates to a method of selecting a frame size of image data in data transmission and a system for executing the same.

2. Description of the Related Art

Recently, with promotion of office automation and the expansion of communication networks, the facsimile apparatuses have rapidly become popular. Further, the public communication networks have been rapidly improved and expanded, so that the data transmission system has found additional various uses such as public service.

To cope with the above situations, 1988 CCITT (International Telegraph and Telephone Consultative Committee) Recommendation T.4 ANNEX A and T.30 ANNEX A prescribe an error correction system anew. Some manufacturers begin to manufacture facsimile apparatuses with the error correcting functions based on the recommendation concerning the error correction system.

The recommended error correction system uses message formats prescribed in the CCITT recommendation T.4 ANNEX A, and performs data transmission according to the transmission procedure under T.30 ANNEX A (see FIG. 1). For the message transmission, the error correction system employs high level data link control (HDLC) frame structure, and an automatic repeat request (ARQ) system in which the data frame based on the half duplex system is repetitively transmitted.

In the transmitter (calling side), the encoded image data is divided into several frames. The framed image data are transmitted, together with the frame numbers. A frame size used is 256 or 64 octet by a digital command signal (DCS) prescribed in the T.30 ANNEX A. The frame size normally used is 256 octet.

When a data error occurs in the frame, a receiver (called side) transmits a partial page request (PPR) under the T.30 ANNEX A to the calling side, and requests the calling side to retransmit the frame containing the error.

Upon reception of the PPR, the calling side retransmits again the requested frame to the called side.

Through such a transmission procedure, the error in the frame is corrected, and the image data not including error is transmitted.

In the facsimile apparatus having the above error correcting function, the frame size of the image data is set at 256 or 64 octet by the DCS when it is transmitted, or may be manually set by an operator every time the data transmission is performed.

A rate of transmission error occurrence in the facsimile communication depends on various conditions such as transmission line conditions and transmission distance. Accordingly, the number of transmission errors is also dependent on those conditions. For example, in the facsimile communication having a high rate of transmission error occurrence, when 256 octet is used for the frame size, an amount of retransmitted data is increased due to the number of the error occurrence, and hence the transmission time is also extended.

To avoid this, for example, the frame size is set at 64 octet, which is smaller than the normal frame size. If the frame size is used, in the above case of the facsimile communication having a high rate of transmission error occurrence, the amount of the retransmitted data is decreased because of the small frame size, 64 octet and, therefore, the retransmission time of data is not extended.

In the facsimile apparatus having the above function, the frame size is manually set by an operator. In the facsimile communication using the facsimile apparatus, therefore, an operator checks a transmission distance from a calling side to a called side, transmission time, and the like, and determines a suitable frame size on the basis of the check results. Thus, since the frame size is selected manually, a frame size may be mistakenly selected.

In this respect, there is a demand of new facsimile apparatus capable of automatically selecting a suitable frame size of the transmitted image data on the basis of the error causing factors in the used transmission line.

SUMMARY OF THE INVENTION

Accordingly, an object of the present invention is to provide a method of selecting a frame size of image data in data transmission and a system for executing the same.

According to one aspect of the present invention, there is provided a facsimile system comprising: storing means for storing image data; determining means for determining a condition of a transmission line; selecting means for selecting a frame size of the image data in accordance with the determined condition; frame producing means for producing frames of the image data in accordance with the selected frame size; and transmitting means for transmitting the produced frame of the image data.

Another aspect of the present invention is to provide a method of selecting a frame size of image data for a data transmission, the method comprising the steps of: storing image data; determining a condition of a transmission line; selecting a frame size of the image data in accordance with the determined condition; producing frames of the image data in accordance with the selected frame size; and transmitting the produced frame of the image data.

BRIEF DESCRIPTION OF THE DRAWINGS

FIG. 1 is a diagram showing a procedure of transmitting image data;

FIGS. 3, 5, 6 and 7 are flowcharts showing the operations of a control/processing circuit in the facsimile system; and FIG. 4 shows a procedure of retransmitting frames of image data.

DETAILED DESCRIPTION OF THE PREFERRED EMBODIMENT

A preferred embodiment of a facsimile system according to the present invention will be described with reference to the accompanying drawings.

Figure 2:
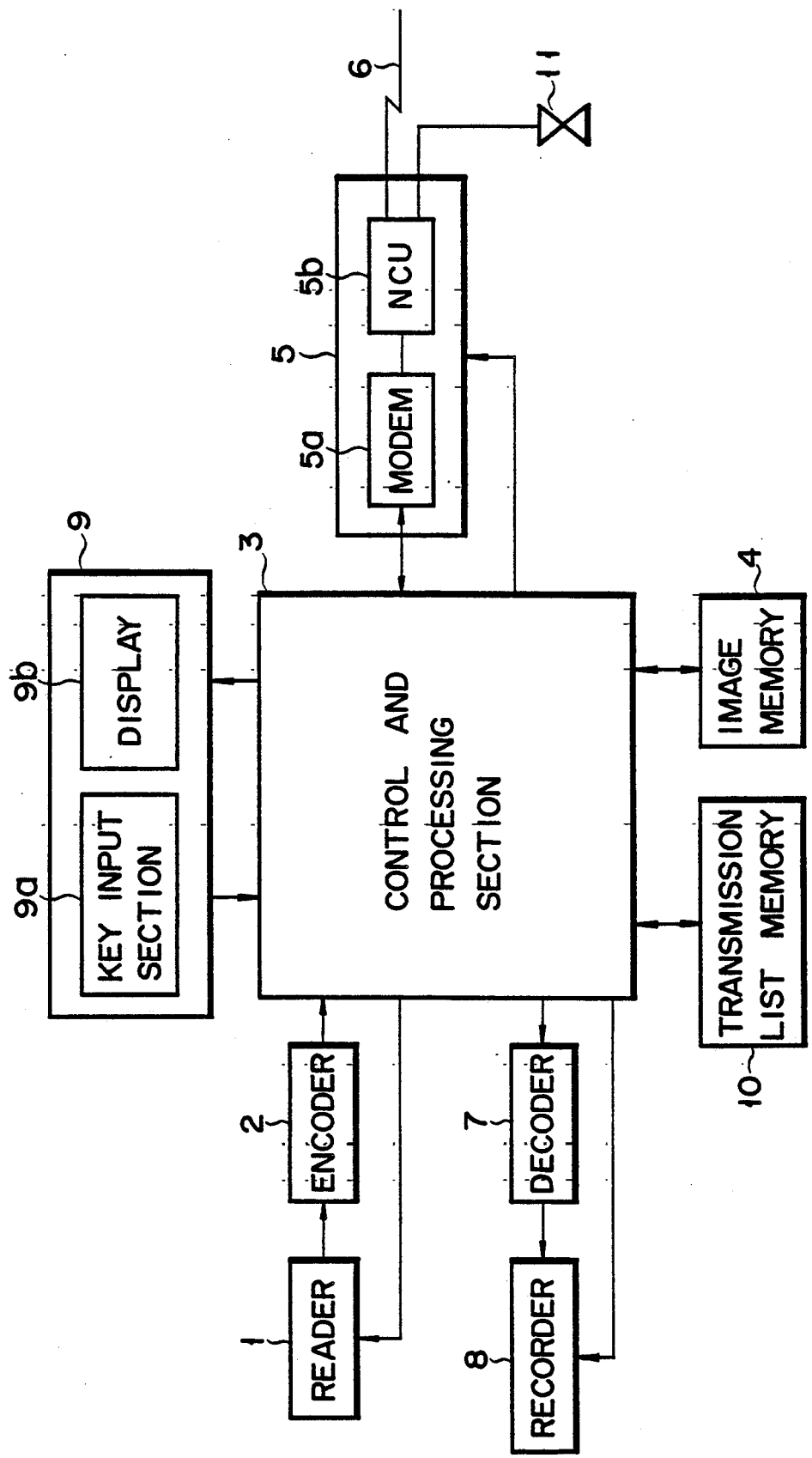
FIG. 2 is a block diagram showing a facsimile system according to the present invention.

In FIG. 2, the facsimile system includes, a reader 1 for reading a document and the like, to be transmitted, an encoder 2 for encoding the image data read by the reader 1, an image memory 4 for storing the encoded image data, a transmitting and receiving section 5 for transmitting and receiving the image data, a decoder 7 for decoding the image data (encoded) received by the transmitting and receiving section 5 through a transmission line 6, a recorder 8 for recording the decoded image data, an operation panel 9, a transmission list memory 10 for storing the transmission list data representing the transmission record of each receiver, telephone 11, and a control and processing section 3 for controlling and processing for facsimile operations.

The operation panel 9 includes a key input section 9a and a display 9b. The transmitting and receiving section 5 includes a modulating and demodulating circuit (MODEM) 5a and a network control unit (NCU) 5b. The image data read by the reader 1 is stored in the image memory 4, and is transmitted to a called side through the control and processing section 3 and the transmitting and receiving section 5.

When receiving a retransmission request from the called side, the control and processing section 3 reads out the requested image data from the image memory 4, and transmits it to the called side.

When the facsimile system of FIG. 2 is called and receives image data from the calling side through the transmission line 6, the image data is stored into the image memory 4 via the control and processing section 3. If the frames of the received image data contain an error, the called side performs a retransmission request for the corresponding new frames to the calling side. The retransmitted image data is stored into the image memory 4. After completion of the retransmission, the image data is read out from the image memory 4, decoded by the decoder 7 through the control and processing section 3, and finally recorded by the recorder 8.

The transmission list data stored in the transmission list memory 10 contains several types of data, such as frame sizes, the number of retransmitted frame sizes, and transmission speeds, that are used in recent several facsimile communications (with the same called side). In particular, the data of the called side to and from which data of the calling side is more frequently transmitted, are stored in the memory 10.

The control and processing section 3, containing a microcomputer (not shown), executes a control for an ordinary data transmission and a control for the facsimile process. Further, it computes a transmission distance between the calling and called sides, and determines the frame size of the transmitted image data.

The transmission distance is computed by using a telephone number stored in the control and processing section 3 and a telephone number of the called side input from the key input section 9a. When the computed distance exceeds a predetermined value, the frame size is set at 64 octet. When it is below that value, the frame size is set at 256 octet.

In the time facsimile communication, the control and processing section 3 checks if the transmission list data of the called side is stored in the transmission list memory 10. When the corresponding data is stored, the section 3 selects a suitable frame size in accordance with the transmission list data.

Some specific operations of the facsimile system thus arranged, in which a frame size of the image data is selected and the image data of the selected frame size is transmitted, will be described with reference to FIGS. 3, 5, 6 and 7.

Figure 3:
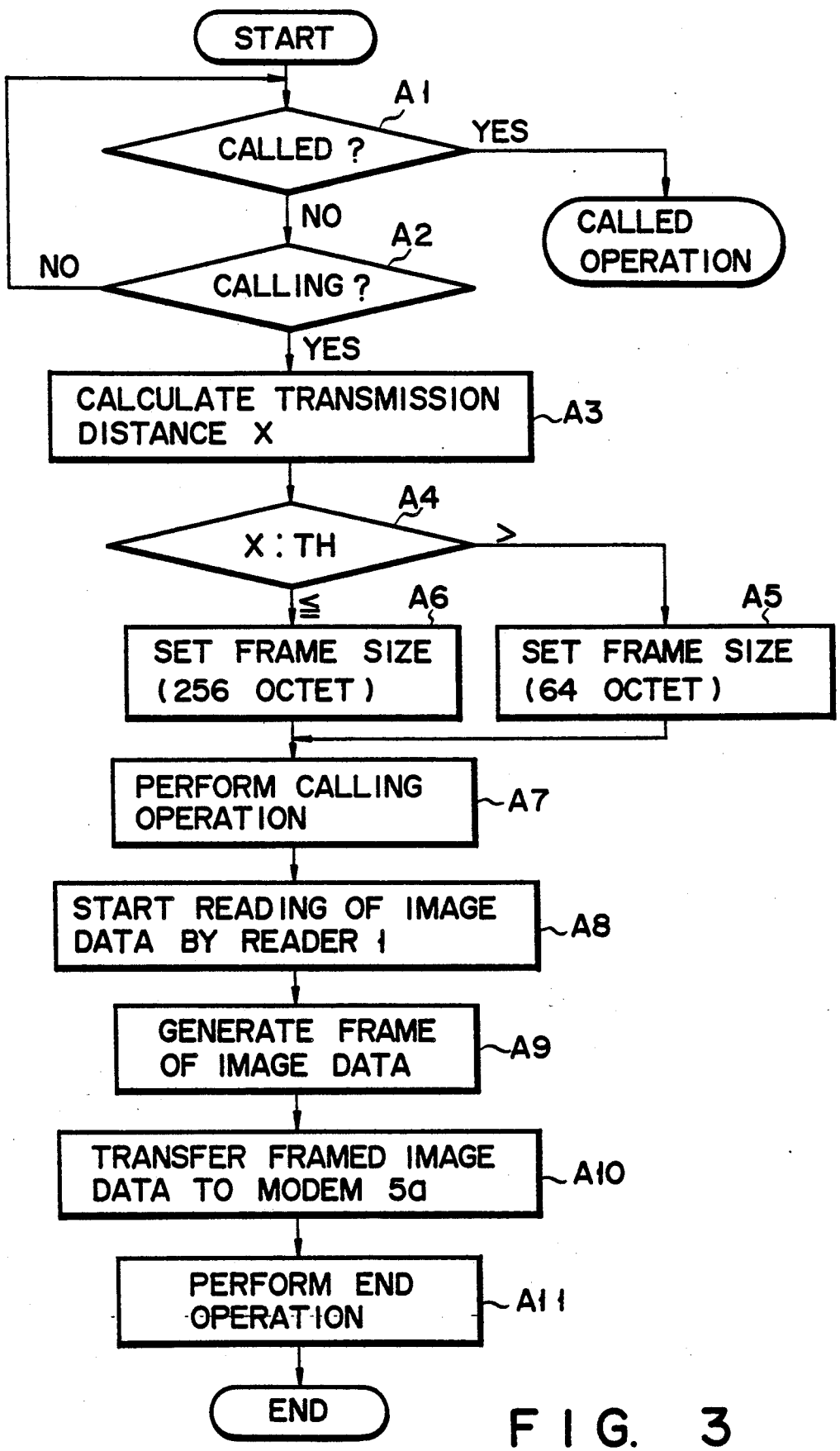

A flowchart shown in FIG. 3 describes how a frame size of the image data is selected in accordance with a distance between a facsimile system (calling side) and another facsimile system (called side) and the framed image data is transmitted.

In FIG. 3, in steps A1 and A2, the control and processing section 3 in the calling side checks if the calling side receives a called signal from or transmits a calling signal to the called side. If a called signal is received (step A1), an ordinary called processing is performed. If an operator inputs a calling command from the key input section 9a (step A2), the control and processing section 3 computes a transmission distance X from the calling side to the called side (step A3). In step A4, section 3 checked if the computed distance X is a long distance, by comparing the distance X with a predetermined value TH.

When $X > TH$ (step A4), 64 octet is selected for the frame size of the image data to be transmitted (step A5). When $X \leq TH$ (step A4), 256 octet is selected for the frame size of the image data to be transmitted (step A6).

In step A7, the message format under CCITT recommendation T.4 ANNEX A is used and a calling operation is performed in the transmission procedure under CCITT recommendation T.30 ANNEX A. In step A8, a reading of the image data by the reader 1, and the read image data is stored into the image memory 4. In step A9, the control and processing section 3 frames the image data in accordance with the frame size selected in step A5 or step A6, and transmits the framed image data to the MODEM 5a (step A10). In step A12, section 3 transmits a message end signal, and releases the transmission line.

As shown in FIG. 4, when transmission of 0 to 255 frames has been completed, a PPS (partial page signal) and an EOP (end of page) are transmitted through the transmission line 6 to the called side. Upon receipt of the PPS and EOP, the called side transmits to the calling side a PPR representing a retransmission request of the received frame containing an error. When receiving the PPR, the calling side transmits the requested frame to the called side again.

In this way, the frame size of the image data to be transmitted is automatically selected in a manner that for a long distance facsimile communication whose error occurring period is short, a small frame size is selected for image data transmission, and for a short distance facsimile communication whose error occurring period is long, a large frame size is selected.

A flowchart shown in FIG. 5 describes how the frame size of the image data is selected and the framed image data is transmitted when an international telephone communication line is used.

In FIG. 5, in steps B1 and B2, the control and processing section 3 checks if the calling side receives a called signal from or transmits a calling signal to the called side, as in steps A1 and A2 in FIG. 3. If a called signal is received (step B1), an ordinary called processing is performed. If an operator inputs a calling command from the key input section 9a (step B2), the control and processing section 3 checks if the upper three digits of a telephone number input from the key input section 9a is "001" (step B3).

If the upper three digits is not "001" (step B3), the control and processing section 3 determines that a called side is domestically located, or the international telephone line is not used. Accordingly, the frame size of the image data to be transmitted is set at 256 octet on the basis of the determination result (step B4).

If the upper three digits of the telephone number is "001" (step B3), the called side is determined to be located overseas. In other words, the control and processing section 3 determines that the international communication line is to be used for the facsimile communication. On this determination, the frame size of the image data is set at 64 octet (step B5).

The determination is made as to whether the upper three digits of the telephone number is "001" before the facsimile communication using the international telephone communication line, because Japan is assigned "001" of the international prefix which must be put before a telephone number when a calling side directly dials an overseas.

In step B6, the calling side and the called side are interconnected through an ordinary calling process. In step B7, the reader 1 reads the image on a document. The read image data is stored into the image memory 4. In step B8, the image data from the image memory 4 is framed in accordance with the selected frame size, and transferred to the MODEM 5a (step B9).

In step B10, when an occurrence of transmission error is informed by the called side, in step B11, the calling side retransmits a new frame corresponding to the frame containing an error (which is specified and informed by the called side) to the called side. Also in step B11, the retransmitted frame is checked if an error occurs during the retransmission. The steps B10 and B11 are alternately repeated until all the image data are correctly transmitted.

After completion of the retransmission of all the image data, in step B12, the control and processing section 3 transmits a message end signal to the called side, and releases the transmission line thus far used.

In this way, for international facsimile communication, the calling side first determines if the called side is located domestically or overseas on the basis of the telephone number. When it is an overseas called side, a small frame size is automatically selected in the calling side. Accordingly, in the international facsimile communication whose transmission line conditions tend to be bad, the amount of retransmitted data can be reduced and consequently a transmission time can also be reduced. This can be realized automatically, not using any manual operation.

FIG. 6 shows a flowchart for selecting a frame size of the image data in accordance with the transmission list data concerning a called side.

In FIG. 6, in steps C1 and C2, the control and processing section 3 checks if a called signal is received and if a calling signal is transmitted. If a calling signal is transmitted, section 3 searches the transmission list data stored in the memory 10 to find that data concerning the called side (step C3).

In step C3, if the corresponding transmission list data is found (step C3), that list data is read out from the memory 10 (step C4). A frame size of the image data is selected in accordance with the list data (step C5). More specifically, in the recent several facsimile communications with the same called side by using a standard frame size, if the number of retransmitted frames and the number of frame retransmissions, and the like, exceeds a preset values, a small frame size is selected (this is 64 octet when a standard frame size is 256 octet).

In step C3, if the corresponding list data is not found, the control and processing section 3 selects a standard frame size (e.g., 256 octet) in step C6.

In step C7, an ordinary calling process is performed. In step C8, the image data stored in the image memory 4 is read out and framed in accordance with the frame size set in step C5 or C6 (step C9). In step C10, the framed image data are transferred to the MODEM 5a.

Following the completion of the image data transmission, step C11 checks if a transmission error occurs during the transmission of the image data.

If an occurrence of transmission error is informed by the called side (step C11), a new frame corresponding to the frame containing that error is transmitted again to the called side (step C12). The step C11 also checks if an error occurs during the retransmission of that frame.

More specifically, when a transmission error occurs, the called side, after receiving the signals PPS and EOP, transmits a PPR to the calling side to request a retransmission of a new frame corresponding to the frame containing the error to the calling side.

After completion retransmission of all the image data, in step C13, the control and processing section 3 transmits a message end signal to the called side, and releases the transmission line. In step C14, the information concerning the above data transmission are stored as transmission list data for the above called side into the transmission list memory 10 in an updated manner.

Thus, the facsimile system according to the present invention stores the number of retransmitted frames, the number of retransmission in recent several facsimile communications with the same called side, and automatically selects the frame size providing an effective facsimile transmission on the basis of the stored list data. This feature eliminates the need of manual selection of the frame size, which is required every facsimile transmission, and additionally eliminates the selection of an improper frame size due to operator's mistaken operation, and a consequent extension of the transmission time.

FIG. 7 shows a flowchart showing operation for selecting the frame size in the training.

In FIG. 7, in steps D1 and D2, the control and processing section 3 checks if a calling signal or a called signal is present, as in the previous cases. If a calling signal is transmitted (step D2), a calling operation is performed in step D3. A frame size of the image data to be transmitted is set at 256 octet in step D4.

In step D5, the control and processing section 3 in a calling side transmits to a destination, a called side, a DCS informing the frame size of the transmitted image data. Then, a training operation starts. A training check (TCF), for example, is used for this training. The TCF has consecutive 0's repeated at intervals of 1.5±0.15 sec. under the CCITT recommendation T.30 ANNEX A.

In step D6, the section 5 checks if the transmission errors are frequent in the training. When receiving an FFT (failure to train) from the called side, it is determined that frequent transmission errors have occurred. In step D7, the section 5 checks if the frame size is 64 octet.

If NO (step D7), the control and processing section 3 sets the frame size at 64 octet (step D8), and returns to step D5 where the training is performed again.

If the transmission errors are infrequent (step D6), the reader 1 starts to read the image data in step D9. The read image data is stored into the image memory 4. In step D10, the image data is framed and then is transferred to the MODEM 5a (step D11).

In this way, 255 frames are all transmitted to the called side. At the completion of the transmission, the PPS and EOP are transmitted to the called side through the transmission line 6 (step D12).

If the frame size is 64 octet in step D7, the frame size is set at 256 octet in step D13, and a transmission speed is changed in step D14, and then the training is again performed in step D5.

As seen from the foregoing description, the frame size may automatically be selected in accordance with transmission line conditions, through the above sequence.

While a specific embodiment of the present invention has been described, it can be variously changed and modified within the spirits and scope of the present invention.

What is claimed is:

1. A data transmission system comprising:
   image storing means for storing image data;
   list storing means for storing transmission list data,
   determining means, coupled to the list storing means, for determining a condition of a transmission line in response to the stored transmission list data;
   selecting means, coupled to the determining means, for selecting a frame size of the image data in response to the determined condition;
   frame producing means, coupled to the selecting means, for producing a frame of the image data in response to the selected frame size; and
   transmitting means for transmitting the produced frame of the image data.

2. The system according to claim 1, wherein the determining means includes means for determining a condition of a transmission line in response to the stored transmission list data including the number of frame retransmissions occurring in several recent facsimile communications with a called side.

3. The system according to claim 1, wherein the determining means includes means for acquiring a transmission distance of the image data; and means, coupled to the list storing means and to the means for acquiring a transmission distance, for determining a condition of a transmission line in response to the stored transmission list and to the acquired transmission distance.

4. The system according to claim 1, further comprising means for updating the transmission list data stored in the list storing means after the transmitting means has tranmitteed the produced frame.

5. A method of selecting a frame size of image data for a data transmission, the method comprising the steps of:
   storing image data;
   storing transmission list data;
   determining, responsive to the storing step, a condition of a transmission line in response to the stored transmission list data;
   selecting, responsive to the determining step, the frame size of the image data in response to the determined condition;
   producing a frame of the image data in response to the selected frame size; and
   transmitting the produced frame of the image data.

6. The method according to claim 5, wherein the step of determining includes the substep of determining a condition of a transmission line in response to the stored transmission list data including the number of frame retransmissions occurring in the last several communications with a called side.

7. The method according to claim 5, wherein the determining step includes the substeps of acquiring a transmission distance of the image data; and determining, responsive to the list storing step and to the acquiring step, a transmission distance, a condition of a transmission line in response to the stored transmission list and to the acquired transmission distance.

8. The method according to claim 5, further comprising the step of updating the transmission list data stored in the list storing means after the transmitting means has transmitted the produced frame.

9. A data transmission system comprising:
   image storing means for storing image data;
   setting means for setting a telephone number;
   determining means, coupled to the setting means, for determining whether the set telephone number is of a certain type including means for generating a determination result;
   selecting means, coupled to the determining means, for selecting a frame size of the image data in response to a determination result;
   frame producing means, coupled to the selecting means, for producing a frame of the image data in response to the selected frame size; and
   transmitting, coupled to the frame producing means, means for transmitting the produced frame of the image data.

10. The system according to claim 9, the determining means including means for determining whether the set telephone number is an international telephone number.

11. The system according to claim 10, the means for determining whether the set telephone number is an international number including means for determining whether the set telephone number is an international number in response to upper digits of the set telephone number.

12. The system according to claim 3, the determining means further including means for acquiring a transmission distance of the image data in response to a combination of a reference telephone number and a telephone number of the called side.

13. A method of transmitting data comprising the steps of:
   storing data to be transmitted;
   setting a telephone number;
   determining, responsive to the setting step, whether the set telephone number is of a certain type including the substep of generating a determination result;
   selecting, responsive to the determining step, a frame size of the data to be transmitted in response to a determination result;
   producing, coupled to the selecting means, a frame of the data to be transmitted in response to the selected frame size; and
   transmitting, coupled to the frame producing means, for transmitting the produced frame of the data to be transmitted.

14. The method according to claim 13, wherein the determining step includes the substep of determining whether the set telephone number is an international telephone number.

15. The method according to claim 14, wherein the substep of determining whether the set telephone number is an international number includes the substep of determining whether the set telephone number is an international number in response to upper digits of the set telephone number.

16. The system according to claim 7, wherein the determining step further includes the substep of acquiring a transmission distance of the image data in response to a combination of a reference telephone number and a telephone number of the called side.

* * * * *